(12) United States Patent
Henning

(10) Patent No.: US 7,249,796 B2
(45) Date of Patent: Jul. 31, 2007

(54) LOCKING MECHANISMS FOR A RETRACTABLE TARPAULIN SYSTEM

(75) Inventor: Steven A. Henning, Speedway, IN (US)

(73) Assignee: Aero Industries, Indianapolis, IN (US)

( * ) Notice: Subject to any disclaimer, the term of this patent is extended or adjusted under 35 U.S.C. 154(b) by 4 days.

(21) Appl. No.: 11/200,610

(22) Filed: Aug. 10, 2005

(65) Prior Publication Data

US 2007/0035153 A1 Feb. 15, 2007

(51) Int. Cl.
*B60P 7/04* (2006.01)
(52) U.S. Cl. ..................................... 296/105
(58) Field of Classification Search .............. 292/105, 292/100.12, 100.16, 121, DIG. 5
See application file for complete search history.

(56) References Cited

U.S. PATENT DOCUMENTS

| | | | | |
|---|---|---|---|---|
| 3,584,905 | A | * | 6/1971 | Emenaker ..................... 292/38 |
| 5,186,516 | A | * | 2/1993 | Alexander et al. .......... 296/121 |
| 5,538,313 | A | | 7/1996 | Henning |
| 6,135,514 | A | | 10/2000 | Kowalewski et al. |
| 6,183,039 | B1 | * | 2/2001 | Kohut et al. ................ 296/155 |
| 6,419,301 | B1 | * | 7/2002 | Tuerk ....................... 296/186.1 |
| 6,511,117 | B1 | | 1/2003 | Henning |
| 6,616,211 | B2 | | 9/2003 | Cramaro |
| 6,793,273 | B1 | * | 9/2004 | Tuerk ....................... 296/186.1 |
| 6,905,161 | B2 | | 6/2005 | Fliege et al. |
| 2006/0220416 | A1 | * | 10/2006 | Mrkovic et al. ............ 296/155 |

* cited by examiner

*Primary Examiner*—Dennis H. Pedder
(74) *Attorney, Agent, or Firm*—Maginot, Moore & Beck

(57) ABSTRACT

Locking systems are provided for a retractable cover system mounted on the bed of a flat bed trailer or similar structure. The cover system includes a bow arrangement for supporting a flexible cover or tarpaulin with a front and a rear bow structure. A front locking mechanism includes a plurality of self-latching latch mechanism mounted within a hollow beam of a bulkhead mounted on the bed. Hasps are mounted to the front bow structure and aligned to activate and engage the latch mechanisms. A rear locking mechanism includes a telescoping mechanism mounted with the rear bow structure. The telescoping mechanism includes a pressure foot that engages a reaction plate mounted to the bed. The pressure foot and reaction plate define complementary features that allow the foot to engage the reaction plate at multiple positions prior to extension of the telescoping mechanism.

18 Claims, 5 Drawing Sheets

LOCKING MECHANISMS FOR A RETRACTABLE TARPAULIN SYSTEM

BACKGROUND OF THE INVENTION

The present invention relates to retractable cover or tarping systems, and especially systems configured for use on the bed of a trailer or other hauling vehicle. More specifically, the invention concerns devices for locking the ends of the retractable tarping system.

Flat bed trailers are used to haul a variety of goods ranging from large heavy articles such as machinery to palletized goods. It is desirable, particularly with regard to weather sensitive goods, to provide a cover to protect a load during transit. Various types of cover systems have been used ranging from simple tarps held in place with cargo straps and tie downs to retractable tarp systems that cover and protect the entire trailer bed from weather and debris.

One such retractable tarp system is the CONESTOGA® tarp cover system manufactured and sold by Aero Industries of Indianapolis, Ind. Details of this type of cover system are disclosed in the U.S. Pat. No. 4,711,484, issued on Dec. 8, 1987, U.S. Pat. No. 4,902,064, issued on Feb. 20, 1990, and U.S. Pat. No. 5,538,313, issued on Jul. 23, 1996, all of which are owned by the assignee of the present invention. The disclosures of the '484, '064 and '313 Patents are incorporated herein by reference. The CONESTOGA® tarp system was developed to provide a tarp cover system that not only effectively encloses the cargo area but also protects or seals the tarp cover deployment system. The CONESTOGA® system includes a wheel and track deployment system that is supported at the outside edges of the trailer. In this manner, the entire trailer bed is under cover.

With flexible cover systems like the CONESTOGA® system, it is important to keep the tarp cover in tension. The tensioned tarp more effectively seals the cargo area from the elements, and resists flapping due to wind and road vibration. In the typical extendable tarp system, the tarp cover is stretched slightly on deployment and latched to front and rear bulkhead structures.

However, the typical tarp cover stretches and becomes loose over time. This leads to billowing and flapping of the cover, particularly at the end sections, which accelerates wear and deterioration of the tarp cover if not addressed. The '064 patent addresses this problem somewhat in the design of the tarp bow guide tracks. The rear portion of each guide track is inclined downwardly, so that as the rearmost bow carrier enters this part of the track, the bow which is attached to this carrier "leans" back and away from the front of the trailer, thereby pulling the tarp taught. Although this approach is automatic in that no special action by the driver of the vehicle is necessary, the amount of tightening that it provides is limited.

The '313 Patent provides another solution integrated into mechanisms for locking the front and rear of the tarping system to either the flat bed or a bulkhead structure that is fixed to the flat bed. Certain details of the system disclosed in the '313 Patent are depicted in FIGS. 1-3. In particular, a retractable cover system 10 is mounted on a flat bed 12. Guide rails 14 are mounted to the sides of the bed 12 and a front bulkhead 17 is mounted to the front of the bed. The cover system 10 is defined by a plurality of intermediate bows 20 and uplift bows 21 that support a cover or tarpaulin 11 (FIG. 2) attached thereto. The bows 20, 21 are supported by carriers 22 that are configured to ride within the guide rails 14.

As shown in FIG. 1, the retractable cover system 10 may include a front bow structure 23 and an opposite rear bow structure 25, both of which are attached to the tarp 11. The rear bow structure 25 is configured to carry a rear door 26 (FIG. 9) that may be a hinged door, as depicted in the figure, or a flap that is rolled upward onto the top of the tarp 11 in a known manner.

The cover system 10 is provided with a front locking mechanism 27 that engages the front bow structure 23 to the front bulkhead 17. A rear locking mechanism 28 is also provided for locking the rear bow structure 25 to the flat bed 12. Details of the front locking mechanism 27 disclosed in the '313 Patent are illustrated in FIG. 2 and are incorporated herein by reference. The mechanism 27 includes a movable component supported on a front bulkhead frame member 30. The front bow structure includes a front beam 24 that carries a plurality of locking members 35 fixed thereto. The mechanism 27 includes a pair of locking bars 32 mounted at either side of the bulkhead 17 so that locking bars can be vertically translated. The locking bars carry a plurality of latches 33 that are configured to engage a corresponding locking pin 35 as the locking bars 32 are moved downward. The bars are moved by rotation of a lifting shaft 37. A hand crank 38 engages the shaft 37 from the outside of the bulkhead 17.

In use, the vehicle operator slides the front bow structure 23 toward the front bulkhead 17 until the locking pins 35 are in proximity to the corresponding latches 33. With the front bow structure so position, the vehicle operator then rotates the hand crank 38 to rotate the lifting shaft and pull the locking bars 32 down until the latches 33 engage the pins 35. On problem with this front locking mechanism 27 is that it can sometimes be cumbersome to keep the front bow structure in the proper orientation relative to the front bulkhead so that the latches 33 uniformly engage all of the locking pins 35. Another detriment is that the locking bars 32 and lifting shafts 37 are open to the cargo space within the front bulkhead 17. Thus, the locking mechanism is susceptible to damage as cargo is loaded onto the flat bed 12. Moreover, the mechanism occupies valuable cargo storage space. There is therefore a need for an improved locking mechanism that avoids these problems when used to lock the retractable cover to the front bulkhead.

Details of the rear locking mechanism 28 are shown in FIG. 3 and are incorporated herein by reference. The mechanism 28 includes a receptacle 40 that is fixed to the flat bed 12. A locking bar 42 includes a locking end 43 that is configured to be received within the receptacle 40. The locking end 43 extends through a slot 46 in a bottom frame element 45 of the rear bow structure 25 so that the mechanism 28 is generally contained within the envelope of the bow structure. The locking bar 42 is pivotably connected to a cam element 47, which is itself pivotably connected to the bow structure 28 at a pivot mount 48. A manual crank 49 may be engaged to the cam element 47 at either side of the pivot mount 48. Rotation of the crank 49 rotates the cam 47, which then pivots the locking bar 42 into locking engagement with the receptacle 40. The cam 47 is configured to exert a tensioning force on the rear bulkhead structure after the locking end 43 is engaged within the receptacle, to thereby apply tension to the tarp 11. In other words, the rear locking mechanism 28 is configured to not only lock the rear bow structure 25 to the flat bed 12, but to also tension the tarp. While this rear locking mechanism 28 provides means for tensioning the tarp, the mechanism is limited to a certain range of tarp stretching. As explained above, most tarps stretch over time, so that the overall length of the retractable cover system 10 necessarily increases from continued use.

While the cam 47 can account for some tarp stretching, it generally depends upon tension in the tarp for its functionality. If the tarp has stretched too much, it cannot provide enough tension force for the full range of movement of the cam. Consequently, there is a need for a locking mechanism that is capable of a significant range of adjustment to control tarp tension while locking a cover system bow structure the flat bed or trailer.

SUMMARY OF THE INVENTION

The limitations of the prior retractable cover system locking mechanisms are addressed by features of the present invention. The present invention contemplates a locking system for a retractable cover system having a bulkhead structure and a bow structure for supporting a cover thereon, the bow structure movably supported relative to the bulkhead structure, the locking system comprises a plurality of self-latching latch mechanisms mounted around a perimeter of the bulkhead structure facing the bow structure and a plurality of latch engagement elements mounted to the bow structure, each configured to actuate a corresponding latch mechanism when the bow structure is moved toward the bulkhead structure. In the preferred embodiment, the bulkhead structure includes a hollow beam forming the perimeter of the bulkhead structure and each of the plurality of latch mechanisms is mounted within the hollow beam. The hollow beam defines an opening for each of the latch mechanisms to receive a corresponding latch engagement element therethrough.

In a further feature, each of the latch mechanisms includes a release lever operable to unlatch the latch mechanism. The locking system includes a cable connected to the release lever of each of the plurality of latch mechanisms, and an actuator for pulling the cable to operate the release lever of each of the plurality of latch mechanisms. Preferably, the cable extends within the hollow beam, while the actuator is manually accessible outside the hollow beam. In certain embodiments, the actuator includes a lever pivotably mounted to the hollow beam, with the cable connected to the lever so that pivoting the lever pulls the cable. In other embodiments, the actuator includes a reversible motor and an activation element, such as an external switch, for activating the motor.

The locking system may further comprise a compressible seal disposed between the bulkhead structure and the bow structure. The seal is compressed between the two structures when each of the latch engagement elements is engaged to a corresponding one of the plurality of latch mechanisms. The seal may be resilient to exert a force separating the bow structure form the bulkhead structure when the latches are released.

In another aspect of the invention, a retractable cover system is provided for a bed of a flat bed or similar trailer, comprising a bulkhead structure mounted to the bed and having a hollow beam forming a perimeter of the bulkhead structure, a bow system carrying a cover thereon and movably supported on the bed, the bow system a leading bow structure configured to engage the hollow beam at the perimeter, and a locking system for locking the leading bow structure to the bulkhead structure. The locking system includes a plurality of latch mechanisms mounted within the hollow beam, the hollow beam defining a like plurality of openings for access to each of the latch mechanisms, and a plurality of latch engagement elements mounted to the leading bow structure and arranged to pass through a corresponding one of the openings for engagement by a corresponding one of the latch mechanisms.

In accordance with a further embodiment of the invention, a locking system for a retractable cover system having bow structure movably supported on a frame mounted to a flat bed or a trailer comprises a reaction plate mounted on the frame, an extension mechanism having a first end pivotably mounted on the bow structure and an opposite second end with a pressure foot mounted thereon, the extension mechanism pivotable relative to the bow structure to move the pressure foot into contact with the reaction plate, and cooperating features between the reaction plate and the pressure foot to prevent relative movement therebetween when the pressure foot is in contact with the reaction plate. The extension mechanism may include an outer tube extending from the first end, an inner tube extending from the opposite end and telescopingly disposed within the outer tube, and a drive mechanism for telescoping the inner tube relative to the outer tube when the pressure foot is in contact with the reaction plate. In certain embodiments, the drive mechanism includes a lead screw threadedly engaging the inner tube at one end thereof and including a driven bevel gear mounted at an opposite end thereof, a drive bevel gear supported on an axle associated with the outer tube, and a crank engageable to the axle and accessible outside the cover system.

According to certain features, the pressure foot is pivotably mounted to the second end of the extension mechanism. The pressure foot may include a pressure surface including the cooperating features for engagement with the reaction plate when the pressure foot is in a locking orientation, and a surface adapted for sliding contact with the reaction plate when the pressure foot is pivoted away from the locking orientation. In certain embodiments, the cooperating features include at least one of a male element or a female element defined on the pressure foot and at least two of a female element or a male element complementary to the element defined on the pressure foot. In the preferred embodiment, the male element is a ridge while the female element is a notch. In order to provide for adjustable positions of the pressure foot relative to the reaction plate, the cooperating features include two of a male element or a female element defined on the pressure foot and spaced apart by a distance, and at least three of a female element or a male element complementary to the element defined on the pressure foot, the at least three elements spaced apart by the distance on the reaction plate.

One object of the invention is to provide locking mechanisms that may be used to lock front and rear bow structures to a bulkhead or a flat bed. Another object is achieved by features of the present invention that accomplish this locking function without significant incursion into the cargo space available inside the retractable tarp.

On benefit of the locking mechanisms of the present invention is that they are easily and readily manually operable from outside the cover system. Another benefit is that certain embodiments are capable of nearly infinite adjustment of tarp tension throughout the entire range of stretched tarp lengths. Other benefits and objects of the invention will become apparent from the following written description, taken along with the following figures.

DESCRIPTION OF THE PREFERRED EMBODIMENTS

Figure 1:
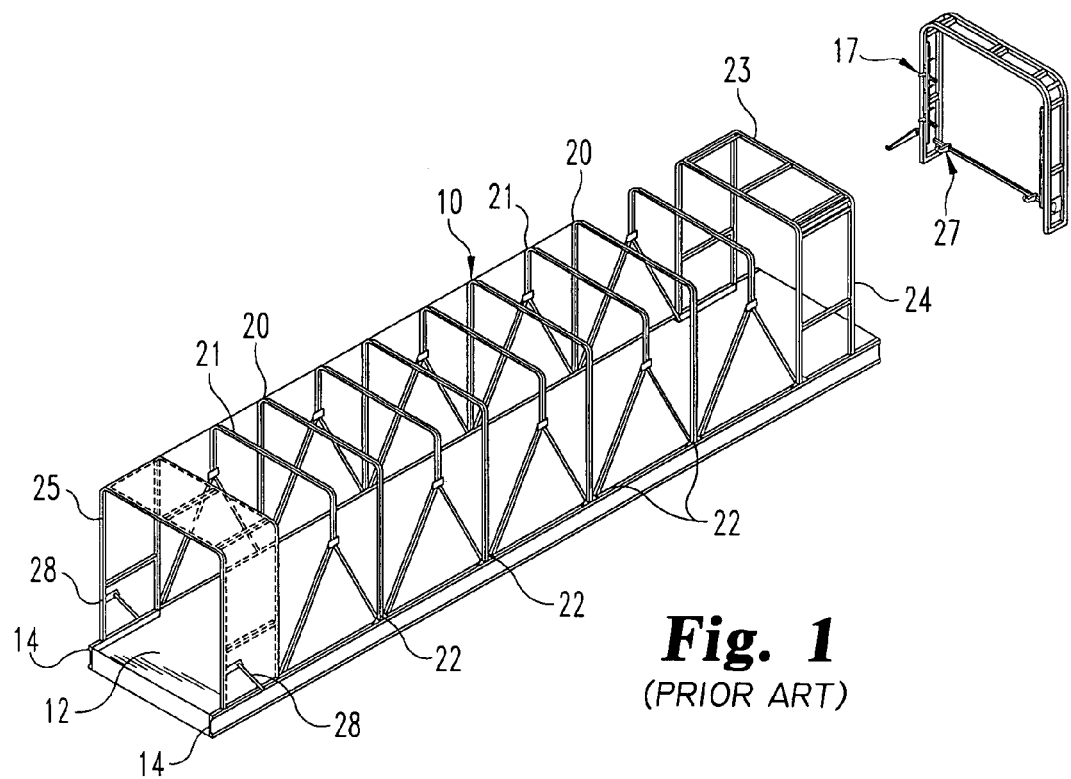
FIG. 1 is a side perspective view of a known retractable cover system.
Figure 2:
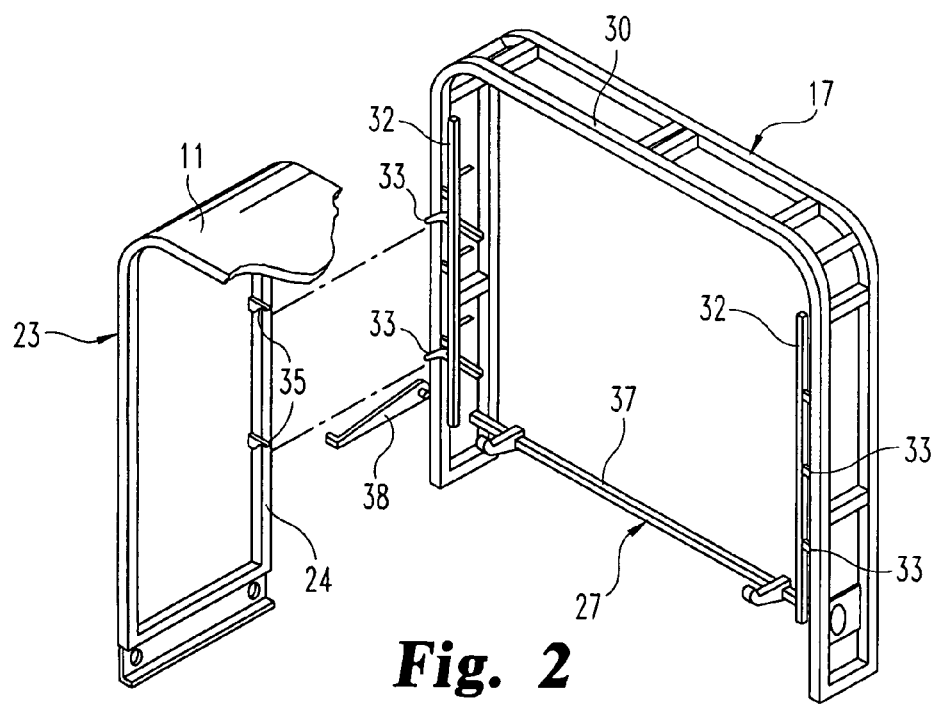
FIG. 2 is a perspective partial view of a front locking mechanism for the known cover system shown in FIG. 1.
Figure 3:
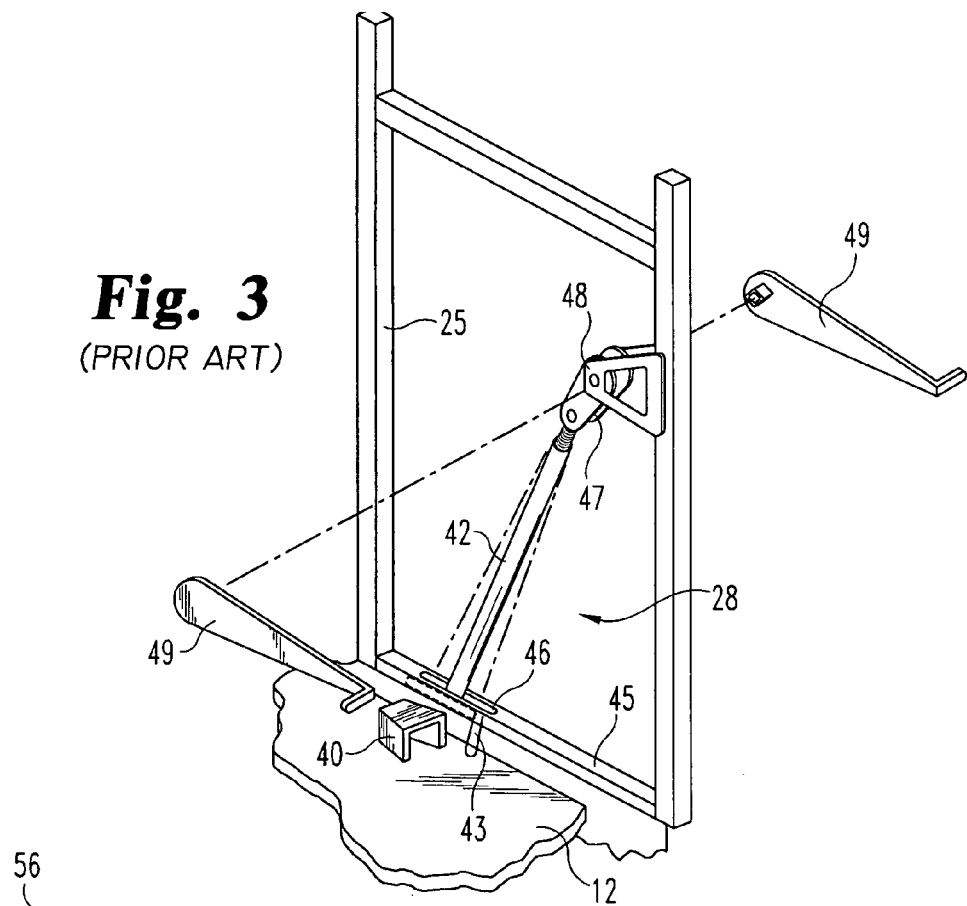
FIG. 3 is a perspective partial view of a rear locking mechanism for the known cover system shown in FIG. 1.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 4:
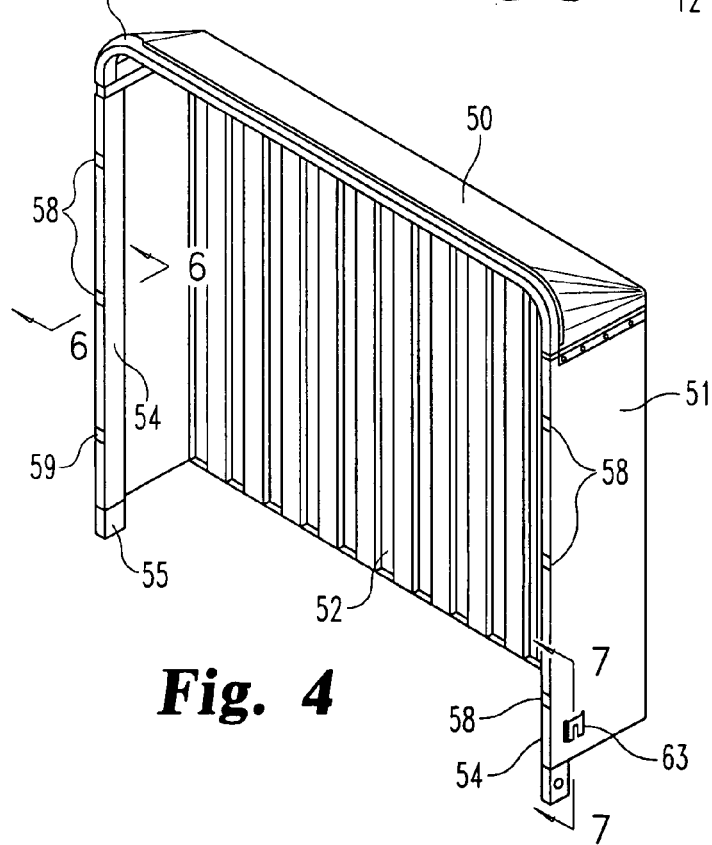
FIG. 4 is a rear perspective view of a front bulkhead incorporating a front locking mechanism according to one embodiment of the invention.

In accordance with one embodiment of the invention, a locking mechanism is provided that is adapted to lock a front bow structure 23 to a front bulkhead, such as the bulkhead 50 shown in FIG. 4. The bulkhead 50 includes side panels 51 and a corrugated front panel 52. The panels are bounded at the sides by vertical beams 54 and a top beam 56. Preferably, the vertical and top beams 54, 56 form a continuous track around the perimeter of the side and front panels 51, 52. The vertical beams 54 may include mounting ends 55 that are configured to fit within support brackets fixed to the side of the flat bed or trailer bed 12.

Figure 5:
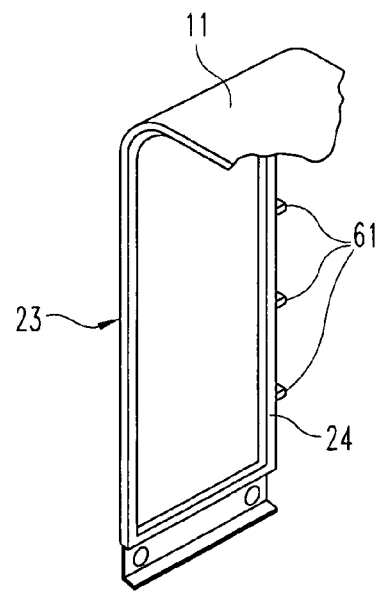
FIG. 5 is a side perspective partial view of a front bow section incorporating components of the front locking mechanism of one embodiment of the invention.

As thus far described, the bulkhead 50 is typical of several known bulkheads provided for use with a retractable cover system. However, in accordance with the present invention, the vertical beams 54 define a plurality of openings 58 which contain latch mechanisms 65, as shown in the cross-sectional view of FIG. 6. The latch mechanism 65 is configured to be self-latching, much like a trunk latch for an automobile. In particular, each latch mechanism 65 is configured to engage a corresponding latch engagement element or hasp 61 fastened to the front beam 24 of the front bow structure 23, as shown in FIG. 5. It is understood that the latch mechanism 65 and hasp 61 are provided in pairs aligned along the vertical beams 54, 24, respectively. In the illustrated embodiment, three hasp/latch combinations are provided along each vertical extent of the mating bow structure and bulkhead. Although not shown, the present invention contemplates that latch mechanisms may also be provided along the top beam 56 of the bulkhead, with corresponding hasps at the top of the front bow structure.

Figure 6:
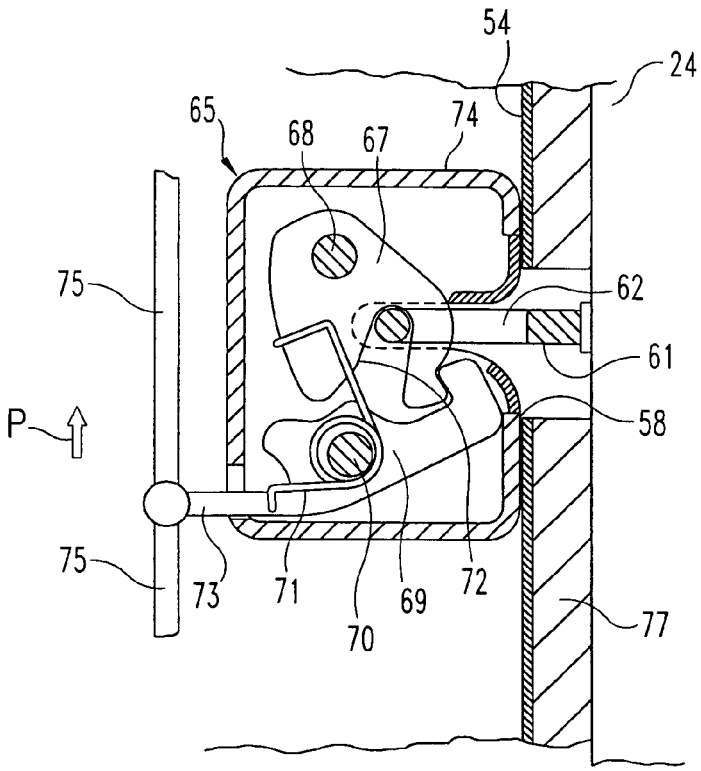
FIG. 6 is a top cross-sectional view of components of the front locking mechanism within the front bulkhead shown in FIG. 4.

As shown in FIG. 6, each latch engagement element or hasp 61 defines a hasp opening 62 that is sized to receive a latch component 67 of the latch mechanism 65. The latch component 67 pivots about a post 68. A torsion spring 71, supported on a second post 70, biases the latch component 67 to an open position which permits entry of the hasp 61 into the latch mechanism 65. As the hasp enters the mechanism, it bears against a cam surface 72 which pivots the latch component 67 against the torsion spring 71. When the latch component 67 is fully disposed through the hasp opening 62, a retaining latch 69 engages the latch component to lock the two latch components together. The latch mechanism 65 thus functions like the typical trunk latch to positively lock the hasp to the latch mechanism, requiring only that the hasp 61 be pushed into the latch mechanism 65. Thus, unlike prior locking mechanisms, the present invention contemplates activation simply by pushing the front bow structure 23 forward until each hasp 61 engage within its corresponding latch mechanism 65.

According to one feature of the invention, the latch component is configured to help pull the hasp into the latch mechanism, and consequently pull the front bow structure toward the bulkhead, as the latch component 67 pivots. The present invention thus contemplates the introduction of a seal 77 situated between the beams of the bow structure and the bulkhead. This seal spans the perimeter of the interface between bow structure and bulkhead and is preferably hastened to the front bulkhead in a known manner. The seal is formed of a compressible elastomeric material so that the seal provides some resistance as the hasp is pushed into the latch mechanism. The seal 77 is preferably compressed as the hasp 61 is locked by the latch component 67 and retaining latch 69. This seal compression provides a weather-tight interface between the bow structure and the bulkhead. Moreover, the seal 77 dampens relative movement between the bow structure and bulkhead as the flat bed and cover system travel on the road.

In order to accommodate any misalignment between the front bow structure 23 and the front bulkhead vertical beams 54, the hasp openings 58 defined in the vertical beams 54 may include beveled or tapered surfaces that are wider and taller than the hasp dimensions, but that are tapered to guide the hasp into contact with the latch component 67 as the front bow structure 23 is advanced toward the front bulkhead. It can thus be appreciated that the front locking mechanism of this embodiment provides a quick and simple manner for locking a bow structure of a retractable cover system to a bulkhead fixed to the flat bed.

In a further feature of this embodiment, the front locking mechanism provides means for quickly and simply releasing all of the latch engagement elements from their corresponding latch mechanisms. In particular, the retaining latch 69 includes a release arm 73 that extends outside the latch housing 74. A cable 75 is fastened to the release arm 73 of each latch mechanism 65. The cable thus passes through the interior of the vertical beams 54 of the front bulkhead 50. In addition, the cable 75 passes through the interior of the top beam 56, which is contiguous with the interiors of the two vertical beams. In other words, the release cable 75 extends from side to side of the front bulkhead and is connected to the release lever of every latch mechanism encountered along the way. One end of the cable 75 terminates at the latch mechanism in the lowermost opening in a vertical beam, such as the opening 59 in FIG. 4.

Figure 7:
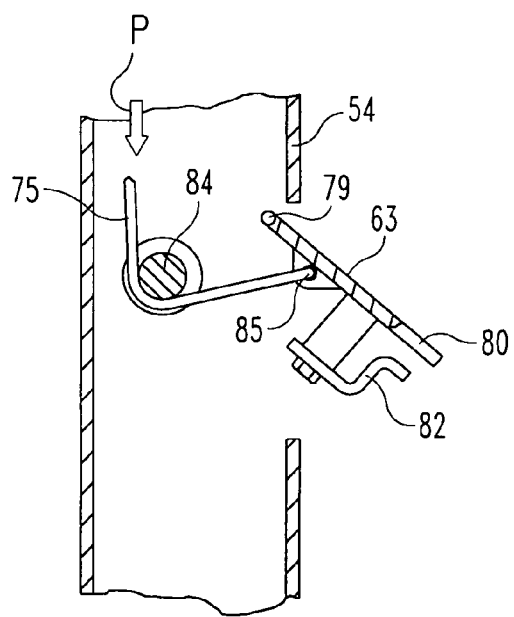
FIG. 7 is an end cross-sectional view of a release lever component of the front locking mechanism shown in FIG. 6.

The opposite end of the cable is fastened to a release lever 63 that is accessible at the opposite side panel 51 of the front bulkhead 50, as shown in FIG. 4. As shown in FIG. 7, the release lever 63 is pivotably mounted at pivot 79 to the vertical beam 54. Preferably, the lever 63 is sized and positioned so that the lever is substantially flush with the outer surface of the beam 54. The lever is provided with a grip notch 80 that is sized so that the lever 63 may be manually gripped ad pivoted about the pivot 79. Preferably, the release lever 63 includes a key lock 82 that may be used to lock the lever to prevent its actuation.

The release cable 75 may pass around a capstan 84 for articulating attachment to the release lever 63 at cable mount 85. It can thus be appreciated that when the lever 63 is pivoted outward, or away from the vertical beam 54, the lever pulls the cable 75 in the direction of the arrow P. Movement of the cable in this direction P pulls the lever arm 73 of the retaining latch 69 so that the latch is pivoted against the torsion spring 71, as appreciated from FIG. 6. As the retaining latch pivots with the movement of the cable in the direction P, the retaining latch 69 disengages the latch component 67. The torsion spring 71 is then free to pivot the latch component so that the component is free of the hasp opening 62. The torsion spring will then hold the latch component 67 and retaining latch 69 apart in position to receive the hasp 61 at a later time. Once the hasp has been released by the latch mechanism 65, the resilience of the seal 77 will tend to push the front bow structure 23 away from the front bulkhead 50.

Figure 8:
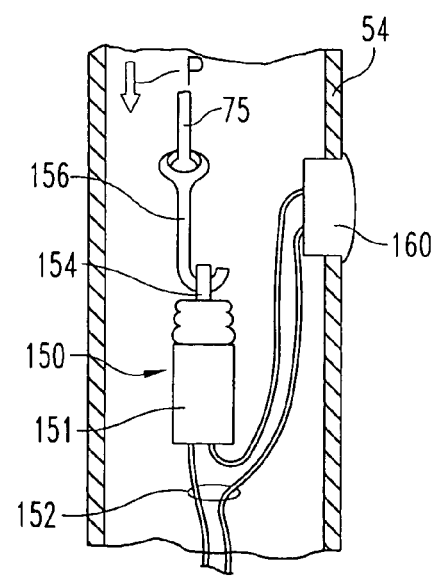
FIG. 8 is an end partial cross-sectional view of an alternative embodiment employing the front locking mechanism employing a powered release component.

Alternatively, the manually operated release lever 63 may be replaced by a powered actuator that pulls the release cable 75. As shown in FIG. 8, a release actuator assembly 150 is an actuator 151 that is electrically powered with wires 152 connected to a power supply. The power supply may be associated with the trailer or hauling vehicle, or may be included with the release actuator assembly 150. In the latter case, an independent battery or rechargeable battery (not shown) may be mounted within the bulkhead 50.

The actuator 151 includes a moveable element 154 that is coupled to a rod 156 in a suitable manner. The rod 156 is engaged to the end of the release cable 75 so that the two components move together. The actuator 151 is operable to reciprocate the element 154 and rod 156 when it is activated to pull the cable 75 in the direction P. The actuator assembly 150 thus operates like the manual lever 63 described above to pull the cable and release all of the latch mechanisms 65.

The actuator 151 is externally activated using an activation element 160 mounted to the outside of the bulkhead, such as on the outer wall of the vertical beam 54 as shown in FIG. 8. The activation element may be any suitable electrical component capable of controlling the operation of the actuator 151, and the nature of the element 160 will depend upon the nature of the actuator. In certain embodiments, the activation element 160 may be a push-button, key pad or key lock. In one embodiment, the actuator 151 includes a motor that is coupled to the moveable element 154 by a gear train that converts motor rotation to reciprocation of the element. One specific actuator is the JW-402 linear actuator sold by AEW, Inc., which incorporates a reversible motor. With this specific embodiment, the activation element 160 is a two-state element that commands the motor of the actuator 151 to rotate in one direction to pull the actuator cable 75 and to rotate in the opposite direction to release the cable. Using a two-state activation element requires operation of the actuator to release the latch mechanisms and to allow the latch mechanisms to latch about the hasp. Alternatively, the actuator 151 can be unidirectional (i.e., only operable to pull the cable) with a return spring to return the cable, and therefore the latch mechanism, to their un-latched position.

In another embodiment, a locking mechanism 90 (FIGS. 8-9) is provided that is particularly suited for tensioning the cover or tarp 11 when it is fully extended along the flat bed 12. In the following description, the locking mechanism is situated at the rear of the retractable cover system and is configured to lock the rear bow structure 25 to the flat bed 12. However, it is understood that the locking mechanism 90 may be used at either or both ends of the cover system to lock the cover system to the flat bed and to tension the tarp 11 in the manner described herein.

Figure 10:
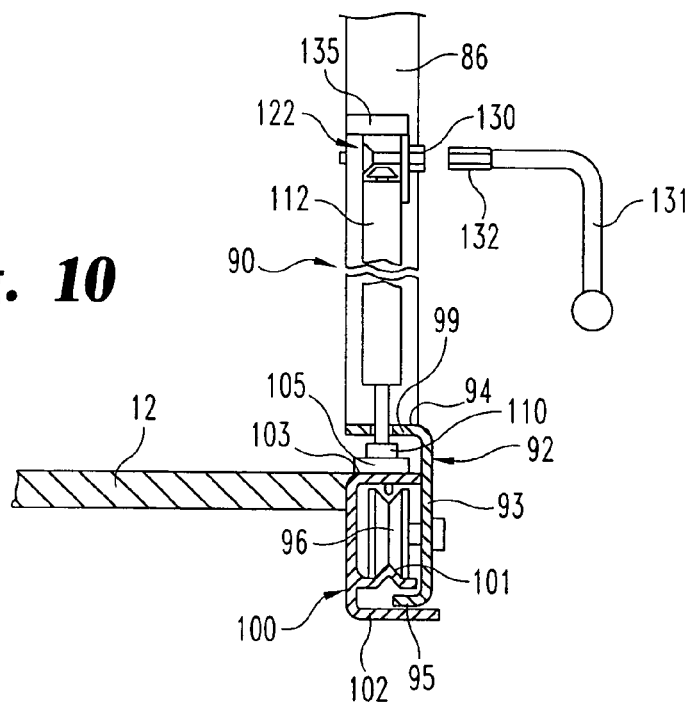
FIG. 10 is an end partial cross-sectional view of the rear locking mechanism shown in FIG. 9.
Figure 9:
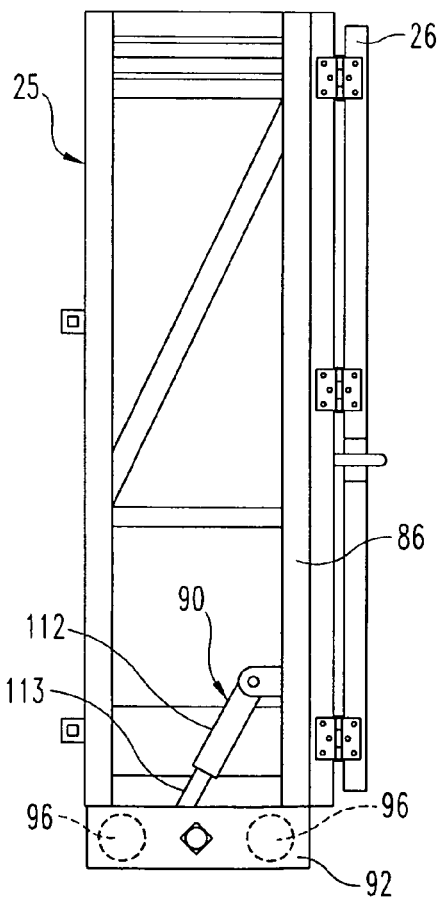
FIG. 9 is a side view of a rear bow structure including a rear locking mechanism in accordance with a further embodiment of the invention.

Each rear bow structure 25 is supported on a corresponding rear carriage 92 that supports guide rollers 96. In particular, the rear carriage 92 includes a side wall 93 with a roller mount 97 (FIG. 11) for supporting the rollers 96 (FIGS. 8-9). The carriage also includes an integral top wall 94 that defines an elongated slot 99 therethrough. A lower wall 95 is integral with the side wall 93 and is situated below the rollers 96. The carriages 92 are configured to be mounted on a guide rail 100 that is fastened to the side of the flat bed 12, as shown in FIG. 10. The guide rail 100 includes a roller rail 101 on which the guide rollers are supported. The guide rail preferably includes an integral bump rail 102 that is situated below the lower wall 95 of the rear carriage 92 and that projects farther away from the flat bed than the other components of the rear carriage to protect those components from damage. A top wall 103 of the guide rail 100 is preferably co-extensive with the upper surface of the flat bed 12. As thus far described, the rear carriage 92 and guide rail 100 are configured in accordance with known retractable cover systems, such as the CONESTOGA® system discussed above and described in the '484, '064 and '313 Patents incorporated herein by reference.

In accordance with the present invention, a reaction plate 105 is mounted to the top wall 103 of the guide rail 100, preferably by screws passing through the mounting holes 107. More particularly, the reaction plate 105 is situated beneath the elongated slot 99 in the top wall 94 of the rear carriage 92 when the rear carriage (and consequently the rear bow structure 25) is situated at the rear of the flat bed 12. The reaction plate 105 includes a plurality of spaced apart ridges 106. The ridges 106 are sized and arranged to be engaged by complementary notches 111 formed in a pressure foot 110. In the illustrated embodiment, the pressure foot includes two such notches 111 so that the foot spans between two successive ridges 106 on the reaction plate 105. The ridges 106 and complementary notches 111 are sized so that their interengagement essentially locks the reaction plate 105 to the pressure foot 110 when appropriate pressure is applied to the foot.

This appropriate pressure is applied to the pressure foot 110 by way of an extension mechanism 112. The mechanism 112 includes an extension tube 113 that is pivotably mounted to the pressure foot 110 by way of a hinge 114. An outer tube 116 is telescopingly supported over the extension tube 113 so that the extension tube can slide in and out relative to the outer tube. This telescoping movement is accomplished in the preferred embodiment by rotation of a lead screw 118 engaged in a threaded insert 120 at the end of the extension tube 113. Thus, rotation of the lead screw 118 in the direction R causes advancement of the extension tube 113 in the direction E. As the extension tube advances it pushes against the fixed reaction plate 105 (which is attached to the guide rail 100 which is fixed to the flat bed 12). This pushing movement results in translation of the rear carriage 92 in the direction T, which is toward the rear of the flat bed. As the rear carriage in the direction T, it carries the rear bow structure 25 with it. Since the tarp 11 is fastened to the rear bow structure, this rear translation T pulls the tarp in tension.

The telescoping arrangement between the extension tube 112 and the outer tube 116 allows for infinitely variable positions of the rear bow structure relative to the fixed guide rail 100 in the direction T. In addition, and advantageously, the variable positions of the pressure foot 110 relative to the reaction plate 105 accommodates virtually any amount of stretching of the tarp 11. For a new retractable cover installation, the pressure foot 110 may be positioned at the forward-most position on the reaction plate 105 (i.e., to the left in FIG. 11 away from the direction of travel T). As the tarp stretches over time, lengthening of the telescoping extension mechanism 112 will eventually be inadequate to tension the tarp with the pressure foot in this forward position. The pressure foot can then be moved to the middle position depicted in FIG. 11, which is closer to the rear of the flat bed, so that extension of the tube 113 will then pull the stretched tarp in the direction T to tension the tarp to an appropriate level. As the tarp stretches further, relocating the pressure foot to the rear-most position closest to the end of the flat bed will provide the ability to tension the tarp by extension of the mechanism 112. It is contemplated that by the time the pressure foot 110 needs to be placed at the rear-most position, the tarp 11 has stretched to the point where it must be replaced.

The length of the reaction plate 105, or more specifically the distance between the forward-most and rear-most positions of the pressure foot 110 on the reaction plate, is generally a function of the elasticity of the tarp. The more the tarp can stretch before it needs replacement, the greater the distance between the forward and rear ridges 106. The incremental positions at which the pressure foot may be locked to the reaction plate determine how much the lead screw must be rotated to fully tension the tarp, as will be explained more herein.

Figure 12:
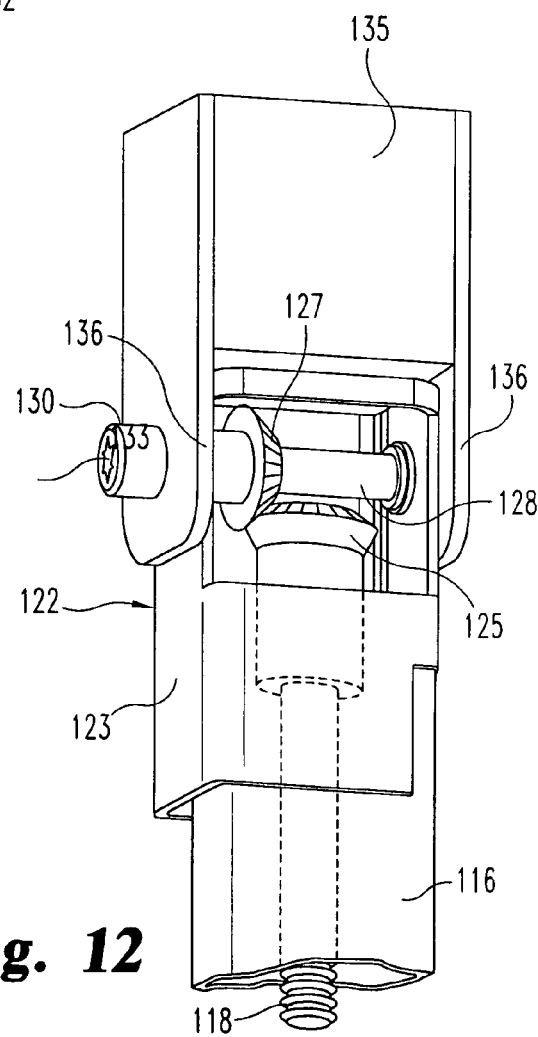
FIG. 12 is an enlarged perspective view of an end of the rear locking mechanism shown in FIGS. 10-11.
Figure 11:
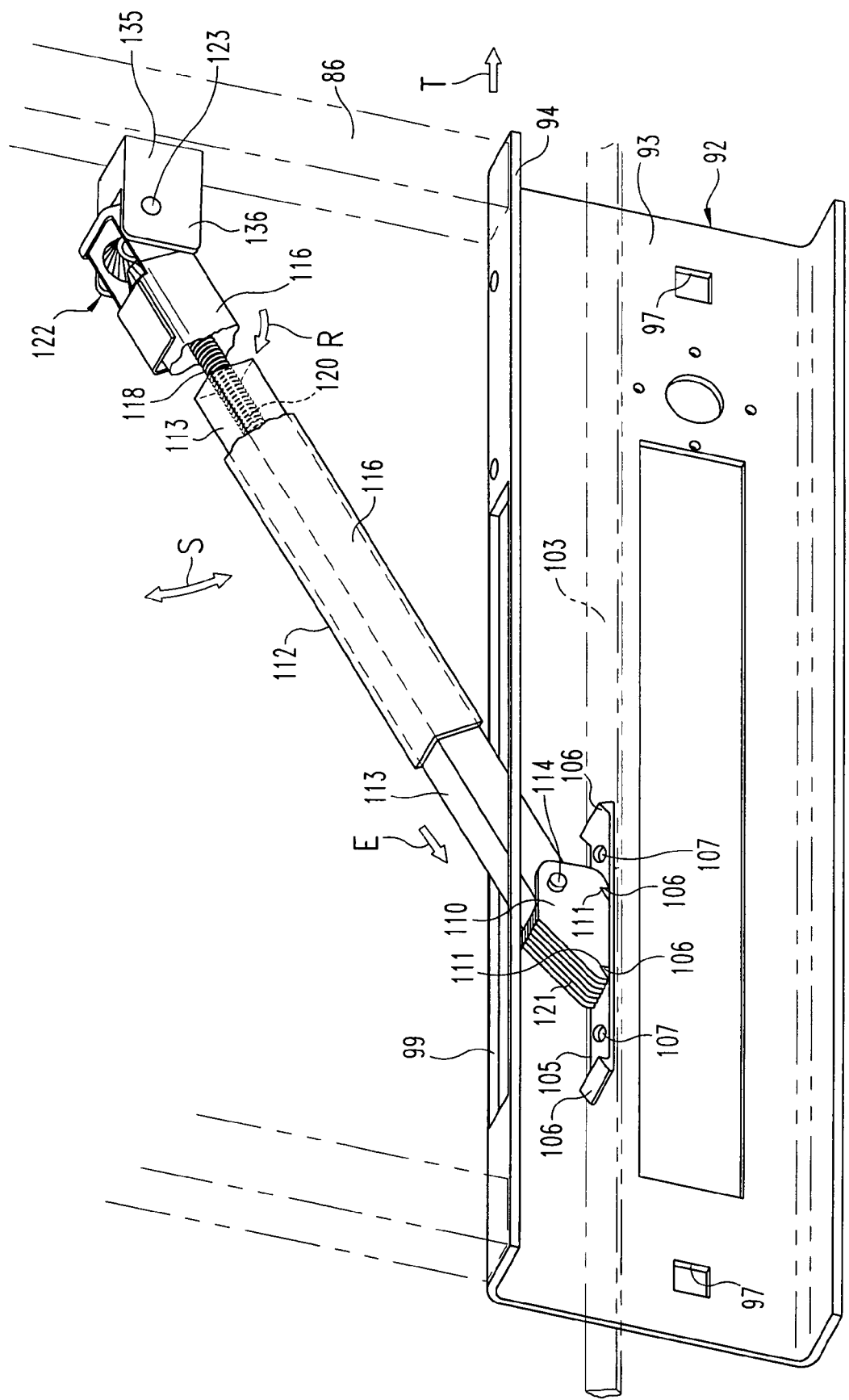
FIG. 11 is a side view of the rear locking mechanism shown in FIG. 10 with portions of the rear bow structure and guide rail shown in phantom.

Rotation of the lead screw 118 is accomplished through a drive mechanism 122 at the end of the outer tube 116, as shown in FIGS. 11-12. The drive mechanism 122 is configured to permit manual rotation of the lead screw from the outside of the cover system. More specifically, the drive mechanism is contained within a housing 123 fixed to the end of the outer tube 116. The mechanism 122 includes a driven bevel gear 125 that is attached to the lead screw 118. The driven gear 125 meshes with a drive bevel gear 127, which is itself supported on a drive shaft 128. The end 130 of the drive shaft 128 includes a mating interface 133 that receives a splined end 132 of a hand crank 131. The end 130 of the drive shaft is accessible outside the rear bow structure so that the operator can simply engage the hand crank 131 to the end 130 to rotate the driven bevel gear 127.

The drive shaft 128 and housing 123 are carried by a support 135 that is fastened to a frame member 86 of the rear bow structure, as shown in FIG. 11. The support 135 includes arms 136 with openings (not shown) through which the drive shaft 128 extends. The housing 123 also includes openings (not shown) that are aligned to receive the drive shaft 128 supported by the arms 136. It can be appreciated that the support 135 not only provides a rotational support for the drive shaft 128, it also supports the housing 123 and outer tube 116 fixed thereto for pivoting relative to the frame member 86. Thus, the entire extension mechanism 112 may swivel in the direction S about the support 135. This movement allows the operator to optimally position the pressure foot 110 on the reaction plate 105, or to disengage the extension mechanism from the reaction plate when it is desired to move the rear bow structure 25 forward.

The pressure foot 110 is provides with a slide surface 121 offset from the notches 111. When the pressure foot is not intended to be used to lock and tension the cover system, the pressure foot 110 is rotated about the pivot mount 114 so that the slide surface 121 is facing the guide rail 100. The slide surface 121 is configured so that it does not catch on or engage the top wall 103 of the guide rail or the reaction plate 105. Thus, with the pressure foot in this orientation, the rear locking mechanism 90 will not impede movement of the rear bow structure 25 forward or backward. Alternatively, the extension mechanism can be fully extended with the pressure foot 110 above the top wall 94 of the rear carriage so that the pressure foot ultimately rests on that wall. The extension mechanism may also be fully retracted so that the pressure foot is offset away from the top wall 104 of the guide rail.

When it is desired to extend the retractable cover system with the front end of the system locked to the front bulkhead 23, the pressure foot 110 is rotated so that he notches 111 face the top wall 103 of the guide rail 100. The rear bow structure 25 is advanced along the guide rail to extend the tarp 11. The rear bow structure is pulled rearward until the pressure foot 110 engages the reaction plate 105 —i.e., until the pressure foot notches are locked with the reaction plate ridges. Preferably, the rear bow structure is pulled rearward by the operator until the tarp is slightly tensioned and the pressure foot is engaged at one of the discrete positions on the reaction plate discussed above. At this point, it should be appreciated that instead of discrete ridge and notch positions, the pressure foot and reaction plate may be provided with a plurality of ridges or transverse splines that may interlock at several positions along the length of the reaction plate. With this alternative configuration or with the configuration shown in FIG. 11, the ridge and notch produce a ratcheting effect as the rear bow structure is pulled rearward.

Once the pressure foot 110 is appropriate positioned on the reaction plate 105, the operator may engage the crank 131 to the drive shaft end 130 to begin rotating the drive shaft. Rotation of the drive shaft is translated to rotation of the lead screw 118 through the meshed bevel gears 125, 127. The operator continues to rotate the crank 131 until the desired amount of rearward movement of the rear bow structure in the direction T has been achieved —i.e., until the tarp is properly tensioned. The crank 131 is then disengaged from the drive shaft and stowed until it is time to retract the tarp 11. To retract the tarp, the crank is rotated in the opposite direction so that the lead screw retracts the extension tube 113, which ultimately dislodges the pressure foot 110 from the reaction plate 105. The pressure foot can then be flipped over so that the sliding surface 121 is facing the guide rail. The rear bow structure may then be pushed forward to retract the cover system.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, the latch mechanisms 65 may comprise a variety of self-latching mechanism, powered and non-powered. Certain powered latch mechanisms incorporate an electrically driven latch 67 that is rotated once the hasp 62 has been inserted into or trips the latch mechanism. The hasps 61 of the illustrated embodiments may be replaced by other connectors suitable for engaging a particular latch mechanism.

In addition, in the illustrated embodiment, the front latching mechanism is described as mounted within the beams of a trailer bulkhead. In certain retractable tarp applications, "wings" or side extensions are added to the sides of a bulkhead to expand its width within DOT regulation limits. The entire bulkhead structure may thus include only the original bulkhead, or the combination of the original bulkhead and the side wings. In alternative embodiments, components of the latching mechanism may be carried by the wings rather than by the original bulkhead to which the wings are attached.

What is claimed is:

1. A locking system for a retractable cover system having a bulkhead structure and a bow structure for supporting a cover thereon, the bow structure movably supported relative to the bulkhead structure, the locking system comprising:
   a plurality of self-latching latch mechanisms mounted around a perimeter of the bulkhead structure facing the bow structure; and
   a plurality of latch engagement elements mounted to the bow structure, each configured to actuate a corresponding latch mechanism when the bow structure is moved toward the bulkhead structure, each of said self latching latch mechanisms includes a release lever operable to unlatch the latch mechanism: and said locking system includes a common cable connected to said release lever of each of said plurality of latch mechanisms and an actuator for pulling said cable to simultaneously operate said release lever of each of said plurality of latch mechanisms.

2. The locking system for a retractable cover system of claim 1, in which the bulkhead structure includes a hollow beam forming the perimeter of the bulkhead structure, wherein each of said plurality of latch mechanisms is mounted within the hollow beam and the hollow beam defines a opening for each of said latch mechanisms to receive a corresponding latch engagement element therethrough.

3. The locking system for a retractable cover system of claim 1, in which the bulkhead structure includes a hollow beam forming the perimeter of the bulkhead structure, wherein:
   each of said plurality of latch mechanisms is mounted within the hollow beam and the hollow beam defines an opening for each of said latch mechanisms to receive a corresponding latch engagement element therethrough;
   said cable extends within the hollow beam; and
   said actuator is manually accessible outside the hollow beam.

4. The locking system of claim 3, wherein:
   said actuator includes a lever pivotably mounted to the hollow beam; and
   said cable is connected to said lever so that pivoting said lever pulls said cable.

5. The locking system of claim 4, wherein said lever includes a lock for locking said lever to the hollow beam to prevent pivoting of said lever.

6. The locking system of claim 1 wherein the actuator includes a motor and an activation element for activating the motor.

7. The locking system of claim 6, wherein the motor is a reversible motor.

8. The locking system of claim 6, wherein said activation element is a switch.

9. The locking system of claim 1, further comprising a compressible seal disposed between the bulkhead structure and the bow structure, said seal being compressed when each of said latch engagement elements is engaged to a corresponding one of said plurality of latch mechanisms.

10. A retractable cover system for a bed of a trailer, comprising:
    a bulkhead structure mounted to the bed and having a hollow beam forming a perimeter of said bulkhead structure;
    a bow system carrying a cover thereon and movably supported on the bed, said bow system a leading bow structure configured to engage said hollow beam at said perimeter; and
    a locking system for locking said leading bow structure to said bulkhead structure, said locking system including;
    a plurality of latch mechanisms mounted within said hollow beam;
    said hollow beam defining a like plurality of openings for access to each of said latch mechanisms; and
    a plurality of latch engagement elements mounted to said leading bow structure and arranged to pass through a corresponding one of said openings for engagement by a corresponding one of said latch mechanisms, each of said latch mechanisms includes a release lever operable to unlatch the latch mechanism; and said locking system includes a common cable connected to said release lever of each of said plurality of latch mechanisms and an actuator for pulling said cable to simultaneously operate said release lever of each of said plurality of latch mechanisms.

11. The retractable cover system of claim 10, wherein at least some of said plurality of latch mechanisms are self-latching.

12. The retractable cover system of claim 10, wherein: said cable extends within the hollow beam; and said actuator is manually accessible outside the hollow beam.

13. The locking system of claim 12, wherein:
    said actuator includes a lever pivotably mounted to the hollow beam; and
    said cable is connected to said lever so that pivoting said lever pulls said cable.

14. The locking system of claim 13, wherein said lever includes a lock for locking said lever to the hollow beam to prevent pivoting of said lever.

15. The locking system of claim 10, wherein the actuator includes a motor and an activation element for activating the motor.

16. The locking system of claim 15, wherein the motor is a reversible motor.

17. The locking system of claim 15, wherein said activation element is a switch.

18. The locking system of claim 10, further comprising a compressible seal disposed between said hollow beam of said bulkhead structure and said leading bow structure, said seal being compressed when said latch engagement elements are engaged to said latch mechanisms.

* * * * *